(12) United States Patent
Cutler

(10) Patent No.: US 7,576,766 B2
(45) Date of Patent: Aug. 18, 2009

(54) NORMALIZED IMAGES FOR CAMERAS

(75) Inventor: Ross Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 11/171,630

(22) Filed: Jun. 30, 2005

(65) Prior Publication Data
US 2007/0019066 A1    Jan. 25, 2007

(51) Int. Cl.
*H04N 7/14*    (2006.01)
*H04N 5/232*    (2006.01)
(52) U.S. Cl. ............... 348/14.08; 348/14.01; 348/14.11
(58) Field of Classification Search ... 348/14.01–14.16, 348/333.12, 211.9, 330.01
See application file for complete search history.

(56) References Cited

U.S. PATENT DOCUMENTS

| | | | |
|---|---|---|---|
| 3,118,340 | A | 1/1964 | Iwerks |
| 5,986,703 | A * | 11/1999 | O'Mahony ............. 348/333.12 |
| 6,208,373 | B1 * | 3/2001 | Fong et al. ............... 348/14.16 |
| 6,297,846 | B1 * | 10/2001 | Edanami ..................... 348/239 |
| 7,020,337 | B2 | 3/2006 | Viola et al. |
| 7,031,499 | B2 | 4/2006 | Viola et al. |
| 7,099,510 | B2 | 8/2006 | Jones et al. |
| 7,197,186 | B2 | 3/2007 | Jones et al. |
| 7,212,651 | B2 | 5/2007 | Viola et al. |
| 2003/0234866 | A1 | 12/2003 | Cutler |
| 2004/0001146 | A1 | 1/2004 | Liu |
| 2004/0061787 | A1 | 4/2004 | Liu |
| 2004/0201710 | A1 * | 10/2004 | Uchihashi et al. ......... 348/211.2 |
| 2004/0263636 | A1 | 12/2004 | Cutler et al. |
| 2006/0023074 | A1 | 2/2006 | Cutler |
| 2006/0023075 | A1 | 2/2006 | Cutler |

FOREIGN PATENT DOCUMENTS

| | | |
|---|---|---|
| JP | 1996125835 | 5/1996 |
| WO | WO/98/47291 | 10/1998 |

OTHER PUBLICATIONS

International Search Report for International Patent Application No. PCT/US06/17590, Microsoft Corporation, Sep. 25, 2007 (2 pages).
"PowerCam Plus and Power Cam Cameras," Polycom Asia Pacific, http://www.polycom.com/products_services/0,1443,ae-4370-7297,00.html [last accessed Apr. 11, 2006].
"TotalView," Be Here Corporation, http://www.behere.com/overview.php, 2 pages [last accessed Apr. 11, 2006].

(Continued)

*Primary Examiner*—Melur Ramakrishnaiah
(74) *Attorney, Agent, or Firm*—Perkins Coie LLP

(57) ABSTRACT

A method and system for producing normalized images of conference participants so that the participants appear to be approximately the same size when the images are displayed is provided. The normalizing system normalizes the size of images based on constraints relating to the distance of participants from the location of the camera. To normalize the image of a participant, the system zooms the camera to account for the distance of the participant from the camera.

15 Claims, 13 Drawing Sheets

OTHER PUBLICATIONS

Healey, Glenn E. and Raghava Kondepudy, "Radiometric CCD Camera Calibration and Noise Estimation," Mar. 1, 1993, IEEE Transactions on Pattern Analysis and Machine Intelligence Mar. 1994, vol. 16, No. 3, © 1994 IEEE, pp. 267-276.

Kamberova, Gerda and Ruzena Bajcsy, "The effect of Radiometric Correction on Multicamera Algorithms," Department of Computer and Information Science, University of Pennsylvania, pp. 1-16.

Kang, Sing Bing and Richard Weiss, "Can we calibrate a camera using an image of a flat, textureless Lambertian surface?," 14 pages.

Majunder, Aditi, Zhu He, Herman Towles and Greg Welch, "Achieving Color Uniformity Across Multi-Projector Displays," Department of Computer Science, University of North Carolina at Chapel Hill, 9 pages.

Szeliski, Richard and Heung-Yeung Shum, "Creating Full View Panoramic Mosaics and Environment Maps," Microsoft Research, 8 pages.

Szeliski, Richard, "Video Mosaics for Virtual Environments," IEEE Computer Graphics and Applications Mar. 1996, vol. 16, No. 2, © 1996 IEEE, 22 pages.

Wang, Hong and Peter Chu, "Voice Source Localization for Automatic Camera Pointing System in Videoconferencing,", ICASSP'97, vol. 1, pp. 187-190, © 1997 IEEE.

* cited by examiner

NORMALIZED IMAGES FOR CAMERAS

BACKGROUND

People at distributed locations commonly hold meetings through videoconferencing. In a typical scenario, a camera and microphone are placed in a room at each location to transmit video and audio to the other location. The camera and microphone are generally connected to a computing system running videoconferencing software responsible for transmitting the data over telephone lines, the Internet, or other network to a remote location. A computing system at the remote location then receives the video and audio data and delivers them to the conference participants using a display screen and speakers.

A camera's orientation is described in terms of azimuth and elevation, and its distance from an object is described in terms of range. Azimuth refers to the rotational angle around the table that the camera is facing. Magnetic north is designated as zero degrees, such that if the camera is facing magnetic north, the azimuth is zero degrees. The action of changing the camera's azimuth is referred to as panning. Elevation is the angle up or down from level that the camera is facing. A camera that is facing level has an elevation of zero degrees. Angles above level are represented with positive values, while angles below level are represented with negative values. The action of changing the camera's elevation is referred to as tilting. Range refers to the distance from the camera to the object whose image is to be captured. The action of making an object appear larger or smaller in an image is referred to as zooming.

In early videoconferencing systems, the camera was stationary and only conference participants that were seated directly in front of the camera could be seen at the remote location. Some videoconferencing systems added the ability to manually pan, tilt, and zoom the camera. Later videoconferencing systems automatically panned and tilted the camera to allow participants at a remote location to see a speaking participant wherever she was located in the room (e.g., using sound and/or vision techniques). Some modern videoconferencing systems use audio from the microphone to position the camera and estimate the distance of the speaking participant from the camera based on volume, however this often results in choosing an incorrect speaker or a disproportionate image size since, for example, some participants speak more loudly than others and other noises in the room such as reflections off of objects may confuse the system.

Even with moveable cameras, it is often difficult to see all of the conference participants. Conference participants are often seated around rectangular tables. Participants at the ends of the table that are farther from the camera appear small and with less detail compared with participants at the sides of the table and closer to the camera. It is distracting for conference participants to have to see some conference participants that may fill an entire display because they are close to the camera and others that may fill only a small portion because they are far away from the camera.

SUMMARY

A method and system for producing normalized images of conference participants so that the participants appear to be approximately the same size when the images are displayed is provided. The normalizing system normalizes the size of images based on constraints relating to the distance of participants from the location of the camera. The system uses the azimuth of the camera and the constraints to estimate the distance from the camera to the participant at which the camera is pointing. To normalize the image of the participant, the system zooms the camera to account for the distance of the participant from the camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
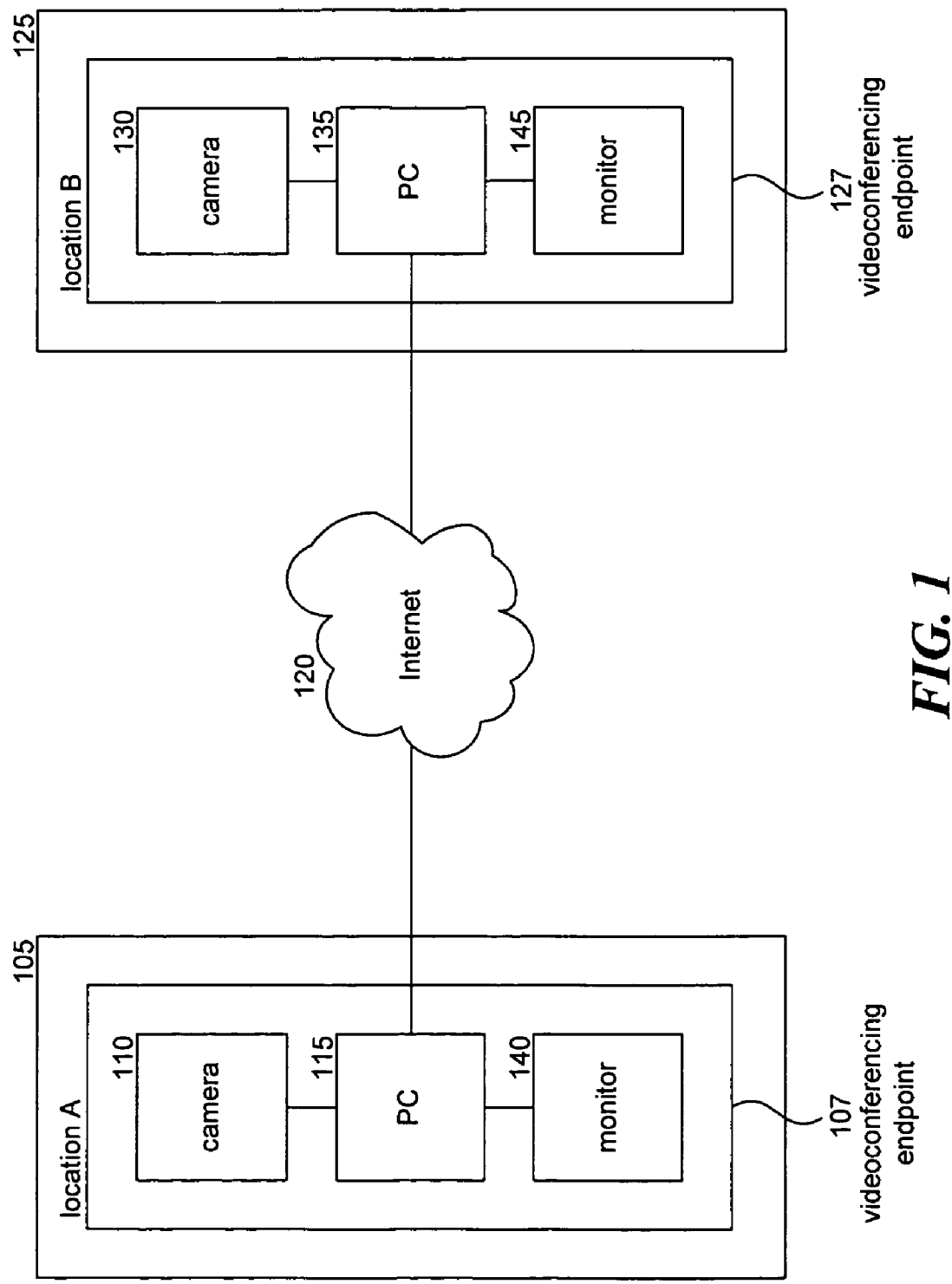
FIG. 1 illustrates a typical scenario with the normalizing system setup at two locations to support a videoconference.

A method and system for producing normalized images of conference participants so that the participants appear to be approximately the same size when the images are displayed is provided. In one embodiment, the normalizing system normalizes the size of images based on constraints relating to the distance of participants from the location of the camera. For example, the constraints may include the table layout of the conference table (e.g., length and width) on which the camera is located in the center. The system uses the azimuth of the camera and the constraints to estimate the distance from the camera to the participant at which the camera is pointing. For example, assume that the table layout is a 5×10 foot rectangle with its length oriented north and south and the camera located in the center. Thus, when the camera points west, then the system may estimate the distance of the participant to be at least 2.5 feet from the camera based on the table layout. When the camera points north, then the system may estimate the distance of the participant to be at least 5 feet from the camera. To normalize the image of the participant, the system zooms the camera to account for the distance of the participant from the camera. For example, the system uses a zoom factor of 1× for a participant who is 2.5 feet from the camera and a zoom factor of 2× for a participant who is 5 feet from the camera. In this way, the conference participants can see a normalized image of the conference participant that the camera is pointing to.

In some embodiments, the normalizing system uses a panoramic camera to capture a single image depicting every azimuth around the table simultaneously. Panoramic cameras generally produce images that are too large to transmit over the Internet or other networks directly. A typical panoramic camera can produce a high resolution image that is 3700×600 pixels. This image can be cropped and scaled to produce an image derived from a portion of the panoramic image that is suitable for transmission over the Internet. A common format for the transmission of videoconferencing data, the common intermediate format image (CIF), has a resolution of 352×288 pixels and is described by the ICU H.261 videoconferencing standard. A computing device receives the panoramic image from the panoramic camera and acts as a virtual camera to point to a particular portion of the panoramic image. Throughout this specification, it will be appreciated by those of ordinary skill in the art that references to panning, tilting, and zooming a non-panoramic camera apply equally well to a virtual camera through cropping and scaling of images received from a panoramic camera. In this description, references to a "camera" may refer to a physical camera, virtual camera, panoramic camera, or non-panoramic camera unless the context indicates that only one or the other is being referred to.

In some embodiments, the normalizing system automatically points the camera at the participant that is speaking. The speaking participant can be identified based on the sound of his voice by using multiple microphones. The videoconferencing endpoint used by the normalizing system may contain multiple microphones distributed around the base along with a camera. The microphones can be used to determine the azimuth of the speaking participant by detecting the delay in receiving a particular sound at each microphone. The microphone that receives a particular sound first is closest to that sound, and the delay in the sound reaching the other microphones allows for a determination of the azimuth of the sound using well-known techniques in the art as described in U.S. application Ser. No. 10/404,219, entitled "A System and Process for Time Delay Estimation in the Presence of Correlated Noise and Reverberation" filed on Mar. 31, 2003, which is hereby incorporated by reference. Once the azimuth is known, the camera is automatically pointed in that direction.

In some embodiments, the normalizing system receives the set of constraints describing the table layout and its orientation relative to the camera as part of an initial setup prior to the conference. The table layout describes the size, shape, and other information about the table. The table layout may have been determined automatically using the camera or other devices or may be manually entered by a participant. For example, the normalizing system may analyze a panoramic image to identify the edges of a table and estimate the distance of the edge from the camera. When a non-panoramic camera is used, the camera may generate a panoramic image by rotating 360 degrees to capture images containing each azimuth. When the camera is not located at the center of the table, the system may determine the offset of the camera from the center of the table so that the normalizing system can factor in the offset when determining the distance to a conference participant.

In some embodiments, the normalizing system may determine an initial position of the camera that the constraints are relative to. The initial position may be established by orienting the base of a panoramic or non-panoramic camera at a fixed position relative to the table. When a non-panoramic camera is panned to either side, the change in azimuth from the initial position can be detected using sensors, a stepping motor, and so on. For example, a light sensor may be used to detect a number of fixed-size ridges that have been passed from the initial position. The azimuth of the camera can then be related to the constraints by factoring in the change in the azimuth from the initial position. For determining the initial position of a panoramic camera, a participant may be asked to orient the base of the camera such that an indicator on the base points toward a particular end of the table. The panoramic camera may also allow selection of the initial position in software, for example, by displaying a panoramic image and asking the participant to select a particular end of the table in the image. Various positions within the panoramic image can be related to the constraints by comparing those positions with the determined initial position.

In some embodiments, the normalizing system accounts for changes in the orientation of the camera relative to the table after the initial setup. For example, conference participants may bump the camera, or move it such that the stored constraints do not correctly reflect the location of the table relative to the camera. To resolve this, the camera may contain a magnetometer which outputs the azimuth of the camera relative to magnetic north, or may use image-based table detection. During initial setup, the system stores the initial orientation, such as be taking a reading from the magnetometer. Since the camera is placed at a fixed position relative to the table during initial setup, the initial reading from the magnetometer specifies the orientation of the table relative to the camera. During a conference, the normalizing system compares the output of the magnetometer with the stored value to determine whether the camera has been moved and by what azimuth. The change in azimuth is used to correct the distance to a conference participant determined from the stored constraints.

FIG. 1 illustrates a typical scenario with the normalizing system setup at two locations to support a videoconference. A videoconferencing endpoint 107 at one location 105 contains a camera 110 attached to a personal computer or other client device 115. A monitor 140 is also attached to the personal computer 115. The videoconferencing endpoint 107 is connected to the Internet 120 or other network to transmit video to a second location 125. A videoconferencing endpoint 127 at the second location 125 contains a personal computer or other client device 135 which has an attached camera 130 and monitor 145. The camera 110 at the first location 105 captures video of the conference participants at that location. The personal computer 115 receives the video from the camera 110 and transmits it to the second location 125 over the network 120. The personal computer 135 at the second location 125 receives the video and displays it on the attached monitor 145 to the participants at the second location 125. Similarly, video from the second location 125 is displayed at the first location 105. In some embodiments, the components of a videoconferencing endpoint may be contained in an integrated videoconferencing device that does not need to be connected to a separate personal computer.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
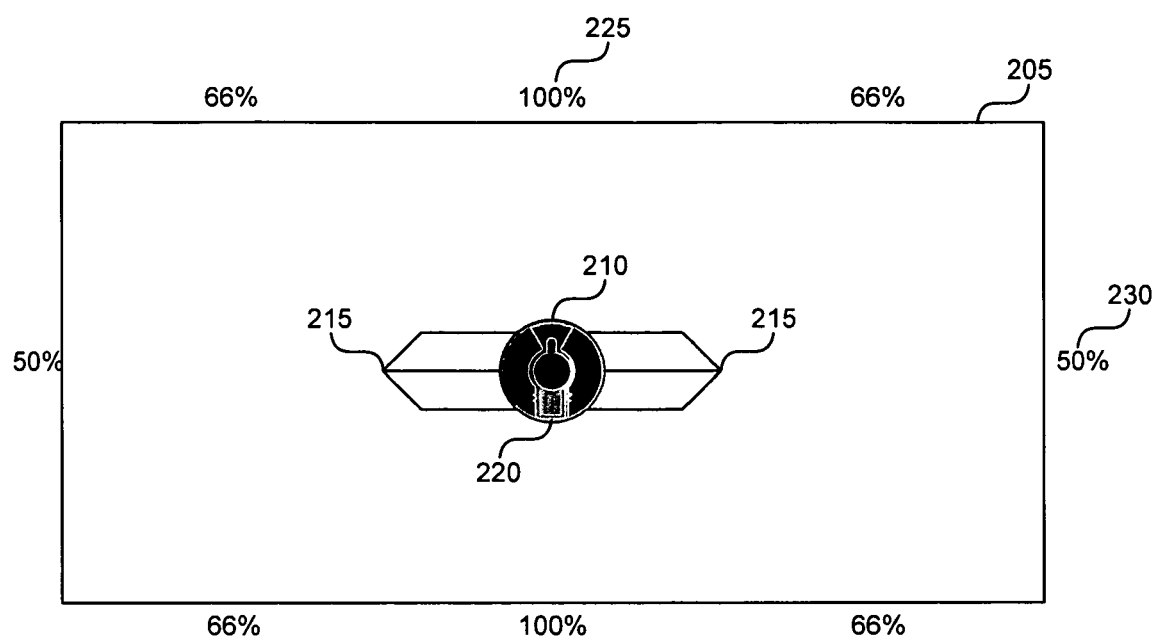
FIG. 2 illustrates a conference room setup using the normalizing system in one embodiment.

FIG. 2 illustrates a conference room setup using the normalizing system in one embodiment. A videoconferencing endpoint 210 is located at the center of a rectangular table 205. The videoconferencing endpoint 210 contains an array of microphones 215 and an LCD display screen 220. The microphone array 215 may include six microphones equally spaced around the base of the videoconferencing endpoint 210. At the edges of the table, relative sizes for participants at various locations around the table are shown. For example, at an end 230 of the table 205, the relative size 50% indicates that a participant at that location will appear 50% as large as a participant seated at a side 225 of the table 205. Zoom factors to produce an image of each participant having a normalized size can be calculated as the reciprocal of the relative size, such that a zoom factor of 2× would be appropriate for a person seated at the end of the depicted table. Appropriate zoom factors depend on the size and layout of the table, as well as the position of the videoconferencing endpoint. While a rectangular table with a videoconferencing endpoint placed at the center is shown in the figure, the normalizing system supports many table sizes, shapes, and layouts. For example, a round table with the videoconferencing endpoint placed at one edge may be used, and the normalizing system will use larger zoom factors for those participants seated farther from the endpoint than for those seated closest to the endpoint.

Figure 3:
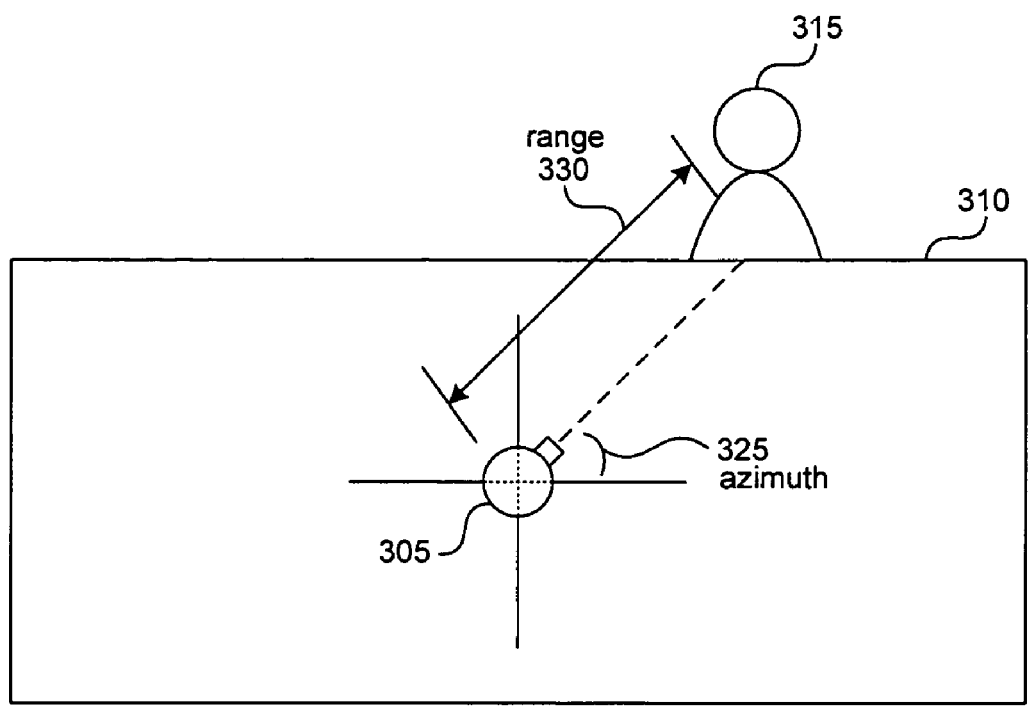
FIG. 3 illustrates common camera positioning terminology using a top and side view of a typical setup of the normalizing system.
Figure 3:
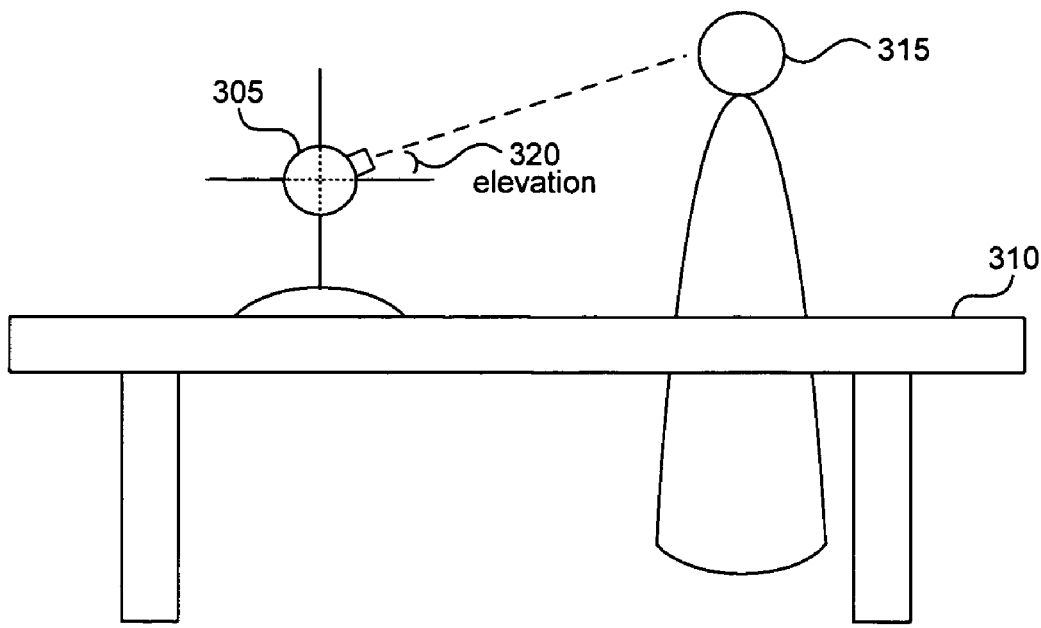

FIG. 3 illustrates common camera positioning terminology using a top and side view of a typical setup of the normalizing system. A camera 305 is located on a table 310. The camera 305 is positioned at a vertical angle to a participant 315, referred to as the elevation 320. The camera 305 is positioned at a rotational angle around the table, referred to as the azimuth 325. The camera 305 has a distance from the participant 315, referred to as the range 330.

Figure 4:
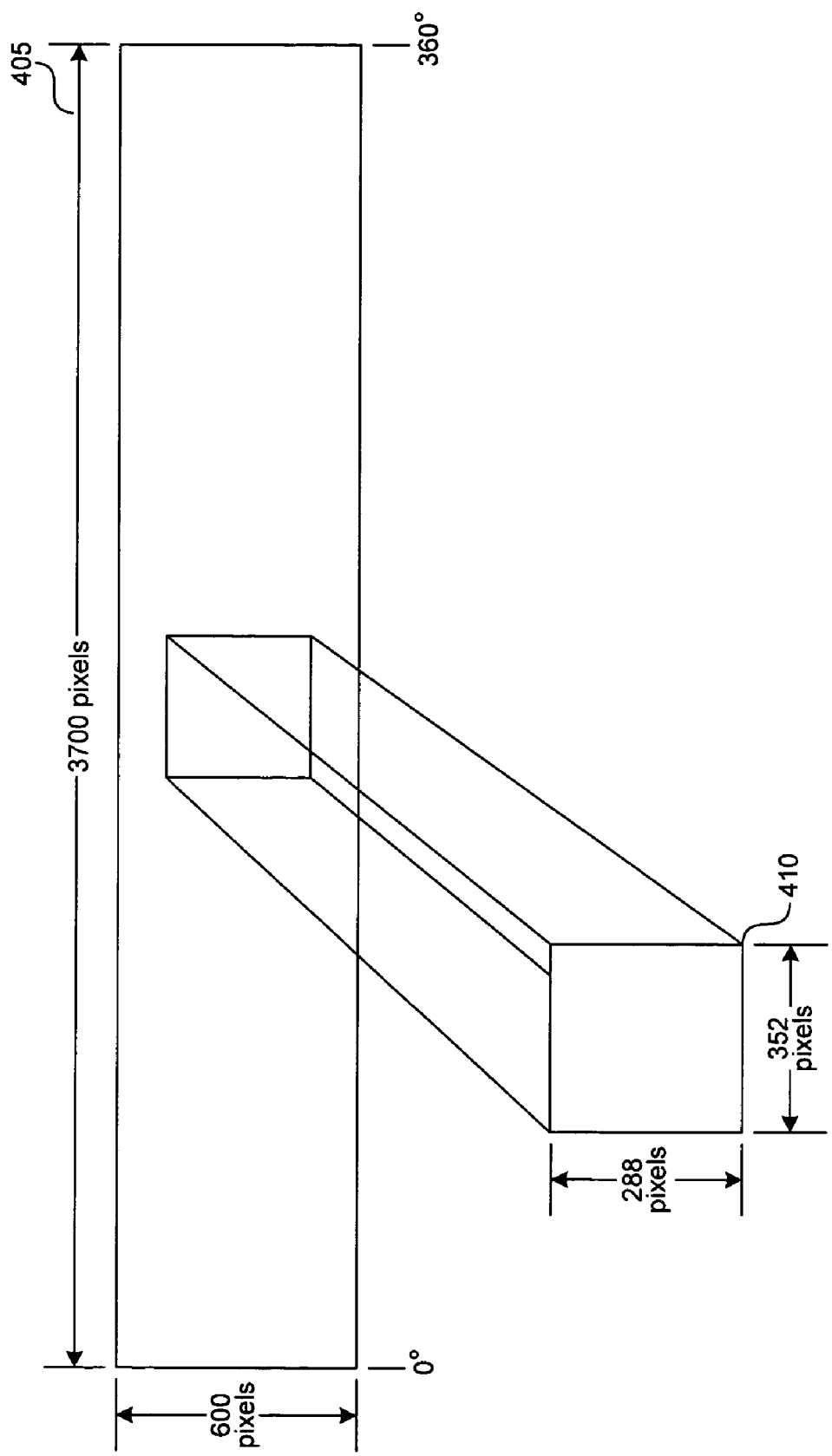
FIG. 4 illustrates the extraction of a CIF image from a panoramic camera image in one embodiment.

FIG. 4 illustrates the extraction of a CIF image from a panoramic camera image in one embodiment. The panoramic camera produces a large image 405 with a high resolution, for example 3700×600 pixels. The normalizing system acts as a virtual camera to select a portion of the large image 405 to produce a smaller image 410, for example with a resolution of 352×288 pixels. The process of moving left to right in the large image 405 is similar to panning, while the process of moving up and down is similar to tilting. When the smaller image is extracted by starting with a subset of the larger image that is not already 352×288, the process of resizing the image to 352×288 is similar to zooming.

Figure 5:
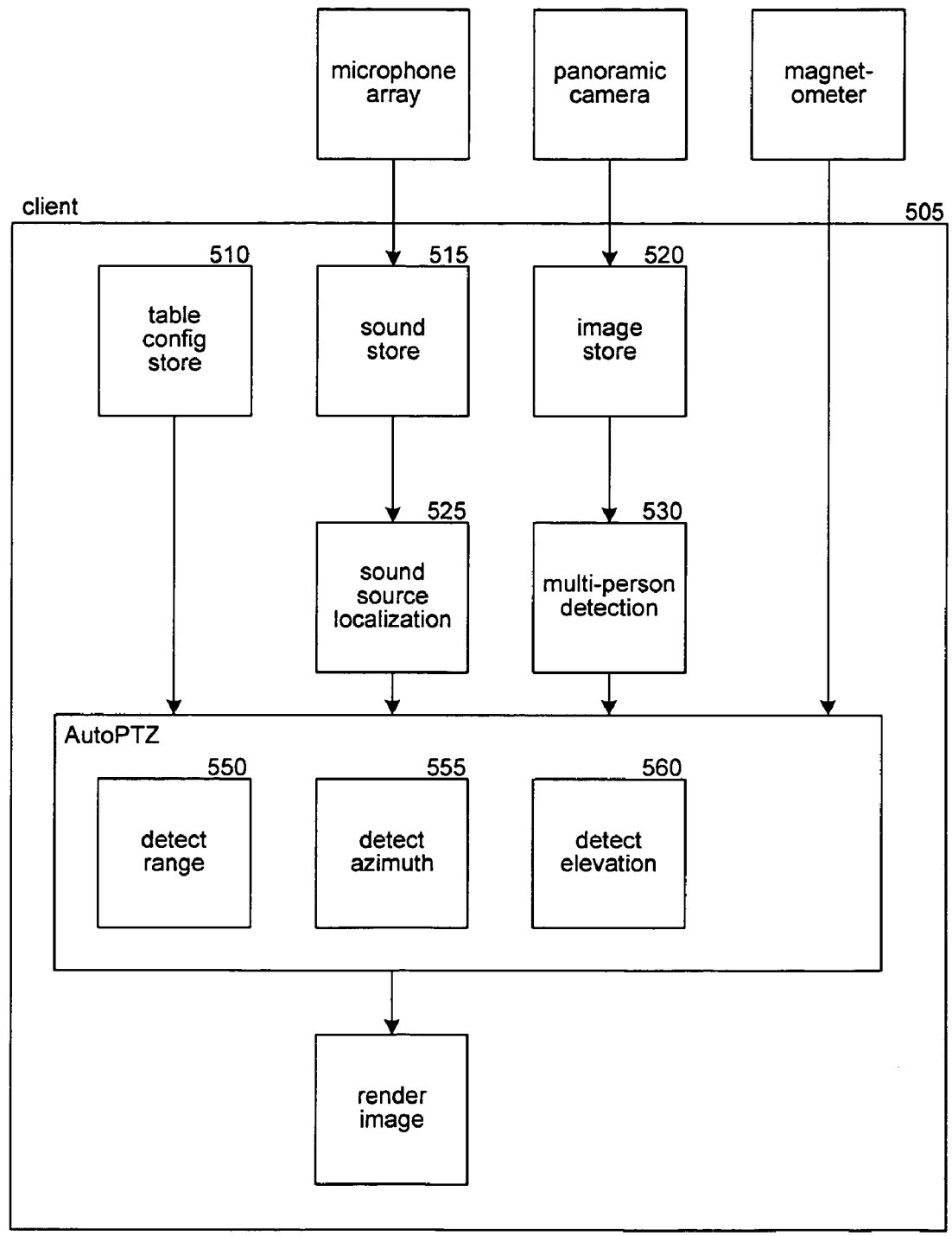
FIG. 5 is a block diagram that illustrates components of the normalizing system in one embodiment.

FIG. 5 is a block diagram that illustrates components of the normalizing system in one embodiment. A client 505 contains a table configuration store 510, a sound store 515, an image store 520, a sound source localization (SSL) component 525, a multi-person detection (MPD) component 530, and an AutoPanTiltZoom component 535. The table configuration store 510 contains constraints describing the layout of the conference table and location of the camera on the table. The sound store 515 contains audio data captured using the microphone array of the videoconferencing endpoint. The image store 520 contains images captured using the camera of the videoconferencing endpoint. If the camera is a panoramic camera, the image store contains a single image representing the output of the panoramic camera showing all directions around the table. The SSL component 525 analyzes audio information from the sound store 515 and determines the probability that a speaking participant is located at any particular azimuth around the table. The MPD component 530 analyzes video information from the image store 520 and determines the probability that a participant is seated at any particular azimuth around the table. For azimuth values where a participant is detected, a bounding box is calculated that encompasses the head of the participant. The MPD component 530 may also locate the edges of the table to determine where to locate the bottom edge of the bounding boxes. When a non-panoramic camera is used, an initial panning of the camera around the room may be performed in order to gather data for the MPD component. The AutoPanTiltZoom component 535 uses information from the table configuration store 510, the SSL component 525, and the MPD component 530 to produce a final image for transmission to other conference participants. The AutoPanTiltZoom component contains a detect range component 550, a detect azimuth component 555, and a detect elevation component 560 each described in further detail below.

Figure 6:
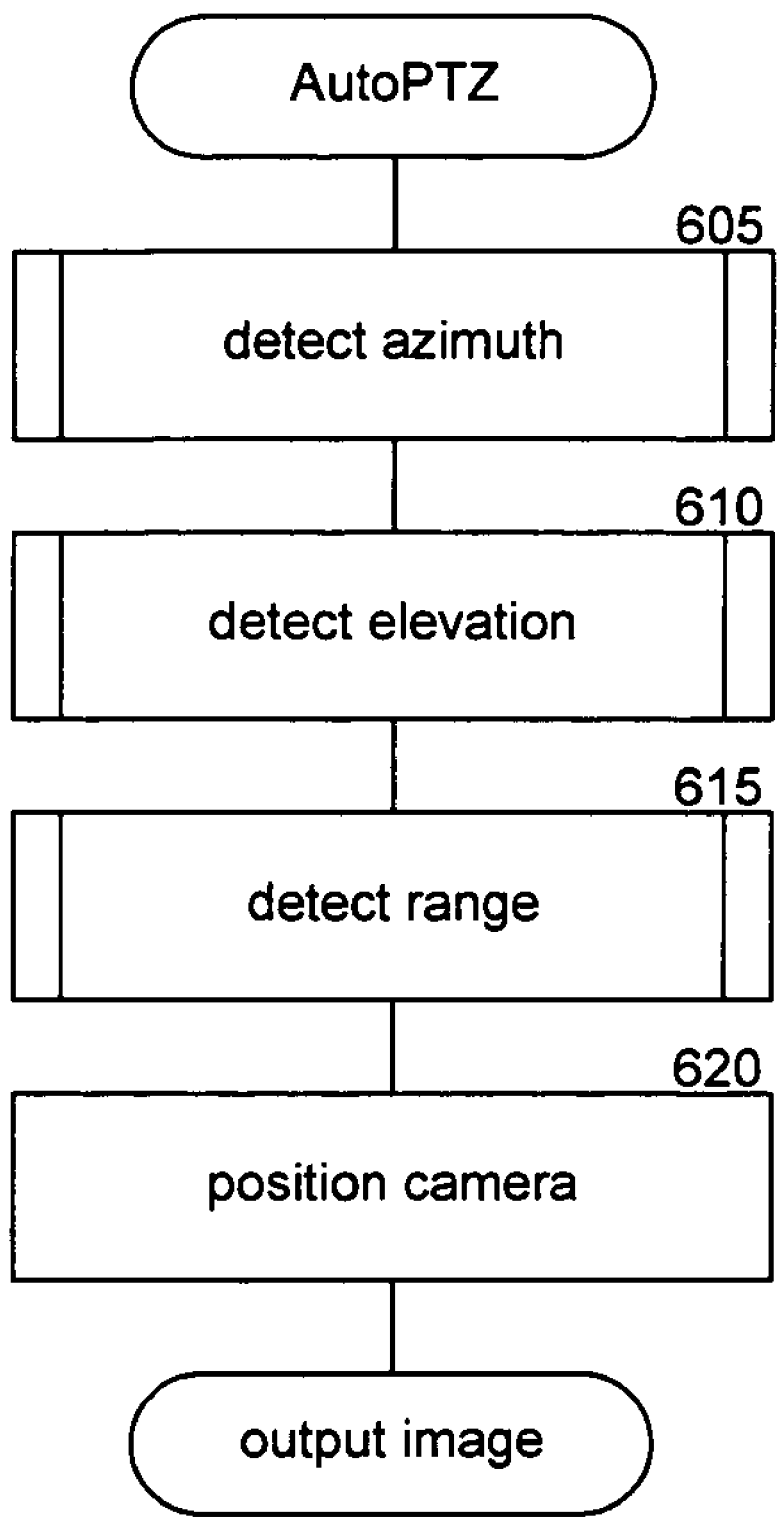
FIG. 6 is a flow diagram that illustrates the processing of the AutoPanTiltZoom component of the normalizing system in one embodiment.

FIG. 6 is a flow diagram that illustrates the processing of the AutoPanTiltZoom component of the normalizing system in one embodiment. The component is invoked periodically throughout a conference to detect when the speaking participant changes and to adjust the camera to produce a normalized image of the participant. In block 605, the component invokes the detect azimuth component to detect the azimuth of the speaking participant. In block 610, the component invokes the detect elevation component to detect the elevation of the speaking participant. In block 615, the component invokes the detect range component to detect the range of the speaking participant from the videoconferencing endpoint. In block 620, the component positions the camera on the speaking participant by panning, tilting, and zooming a non-panoramic camera, or cropping and scaling a panoramic image provided to a virtual camera. The component then completes.

Figure 7:
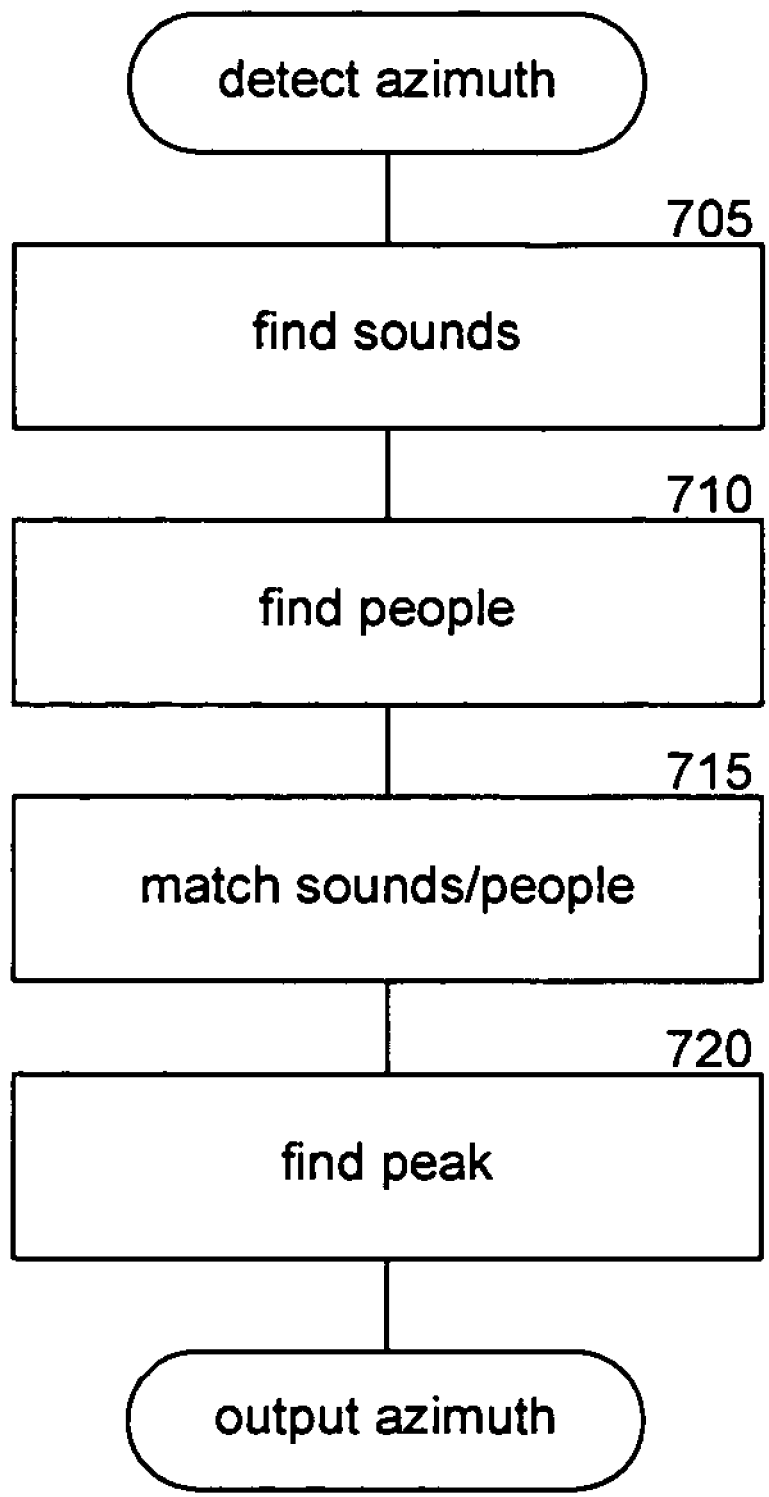
FIG. 7 is a flow diagram that illustrates the processing of the detect azimuth component of the normalizing system in one embodiment.

FIG. 7 is a flow diagram that illustrates the processing of the detect azimuth component of the normalizing system in one embodiment. The component is invoked to detect the azimuth of a speaking participant. In block 705, the component receives information from the SSL component indicating the probability that a speaking participant is located at any azimuth around the table determined using audio data. In block 710, the component receives information from the MPD component indicating the probability that a participant is located at any azimuth around the table determined using video data. In block 715, the probability received from the SSL component is added to the probability received from the MPD component to produce a combined probability that a speaking participant is located at any azimuth around the table. Combining the SSL and MPD data may also use a weighted average, neural networks, or Bayesian networks such that more weight is given to information received from the SSL component or MPD component in producing the combined probability. In block 720, the highest probability azimuth is selected as the location of the speaking participant. The component then completes.

Figure 8:
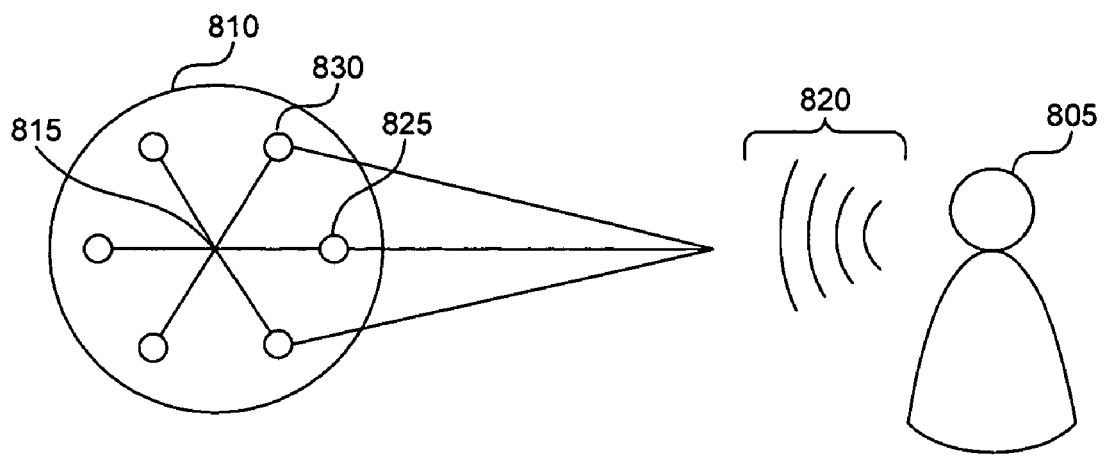
FIG. 8 illustrates the use of a microphone array to detect the position of the speaking position by the SSL component in one embodiment.

FIG. 8 illustrates the use of a microphone array to detect the position of the speaking participant by the SSL component in one embodiment. A conference participant 805 is seated around a videoconferencing endpoint 810. The videoconferencing endpoint 810 contains an array of microphones 815 around its perimeter. Audio waves 820 reach each of the microphones at a different time. For example, audio waves from the participant in the figure will reach microphone 825 before microphone 830 since microphone 825 is closer to participant 805. The position of the participant can be determined by using the delay information from each microphone to triangulate the participant using techniques commonly known in the art.

Figure 9A:
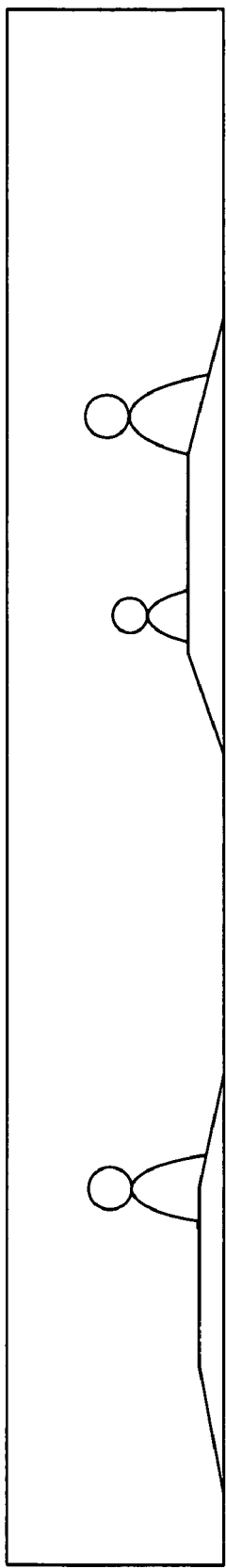
FIGS. 9a and 9b illustrate output produced by the MPD component of the normalizing system.
Figure 9B:
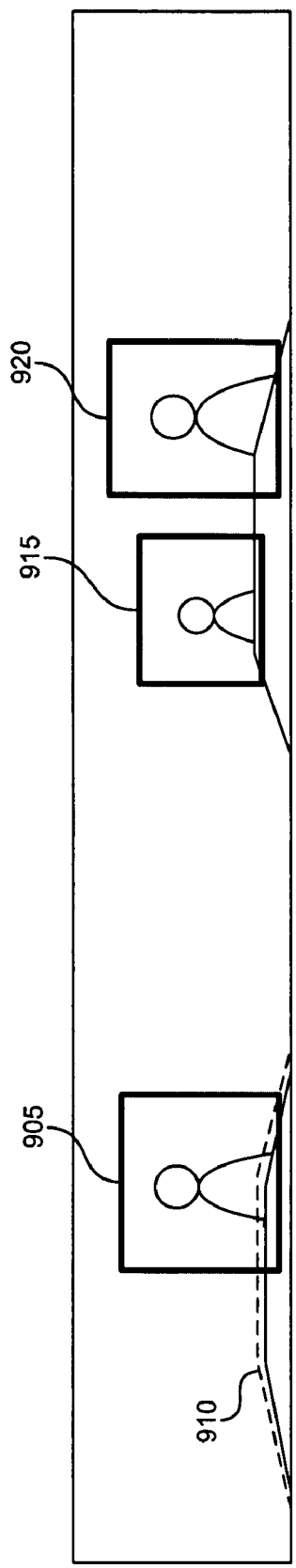

FIGS. 9a and 9b illustrate output produced by the MPD and SSL components of the normalizing system. FIG. 9a shows the image produced by a panoramic camera, and FIG. 9b shows the same image with lines indicating information determined by the MPD and SSL components. A bounding box 905 is shown drawn around a participant at one end of the table, which uses the detected table edge 910 as its lower edge. Bounding boxes for farther participants 915 are smaller than those for closer participants 920 indicating the difference in zoom that should be applied to normalize the size of each participant.

Figure 10:
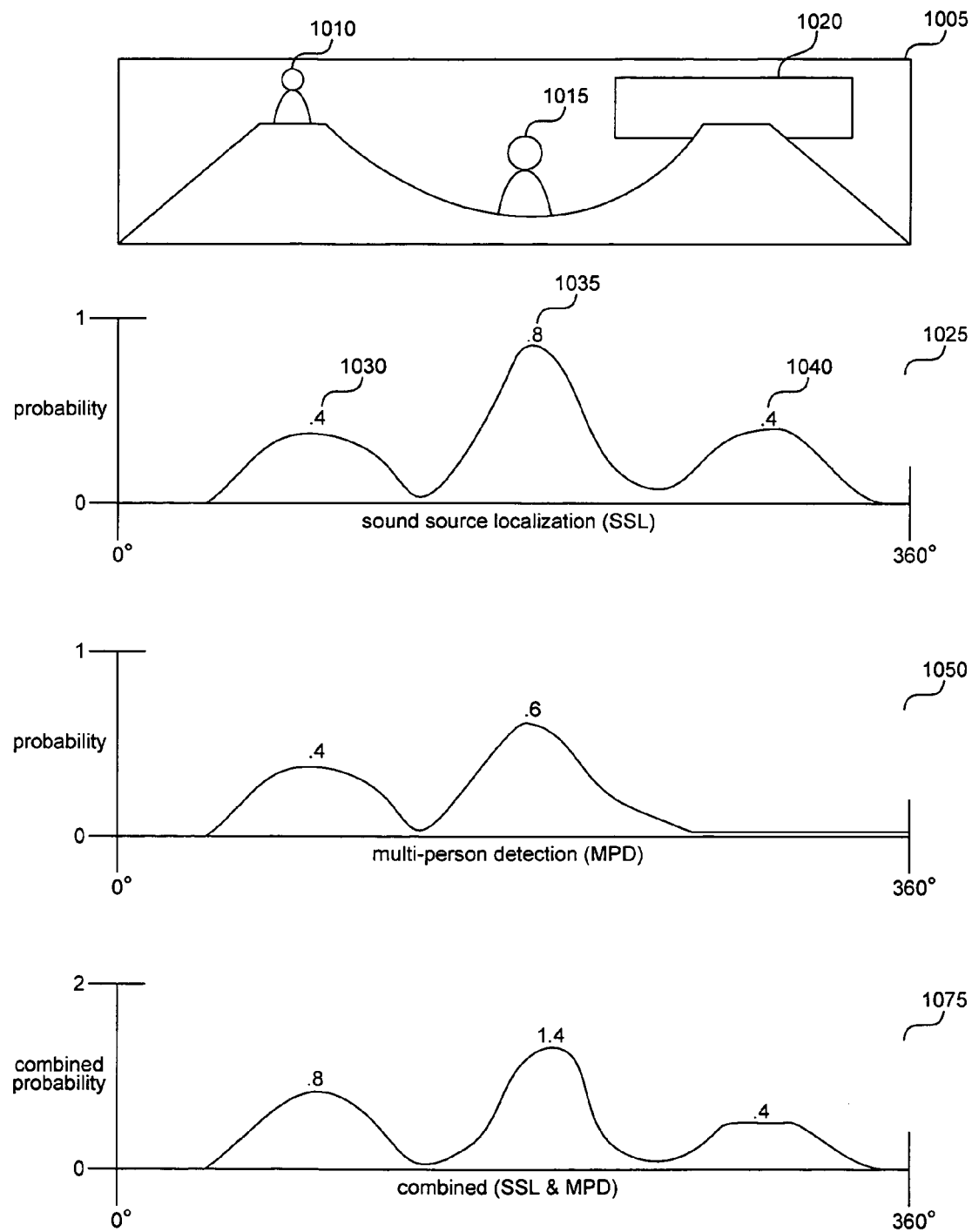
FIG. 10 shows a graph of the probabilities detected in a typical invocation of the detect azimuth component.

FIG. 10 shows a graph of the probabilities detected in a typical invocation of the detect azimuth component. An image 1005 is shown which can be from a panoramic camera, or can be produced by stitching together several images from a non-panoramic camera to produce a single image showing an entire conference room. The image 1005 contains two participants 1010 and 1015. A graph 1025 shows the probability produced by the SSL component using audio data that a speaking participant is located at a particular location. Three peaks 1030, 1035, and 1040 are shown. While the first two peaks, 1030 and 1035, are likely due to sound made by the conference participants, the third peak 1040 could be produced by noise bouncing off of a whiteboard 1020 in the conference room. In order to improve the data gathered by the SSL component, data from the MPD component, shown in the second graph 1050, is added with the SSL data to produce a total probability depicted in the third graph 1075. The third graph 1075 shows a peak at the location of the center participant 1015 indicating that she is most likely the speaking participant.

Figure 11:
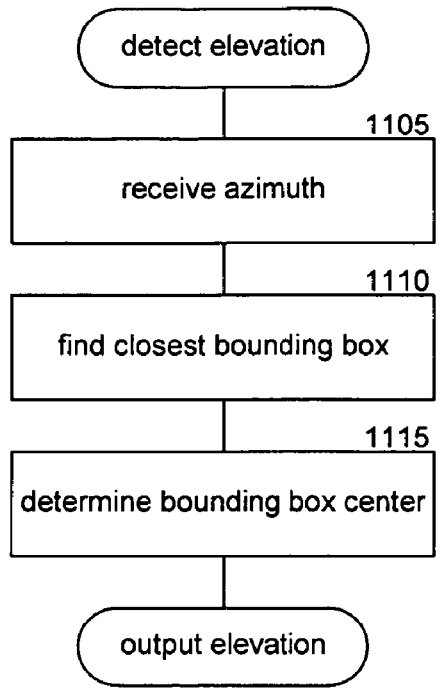
FIG. 11 is a flow diagram that illustrates the processing of the detect elevation component in one embodiment.

FIG. 11 is a flow diagram that illustrates the processing of the detect elevation component in one embodiment. The component is invoked to detect the elevation of the speaking participant. In block 1105, the component receives the azimuth of the speaking participant as determined by the detect azimuth component. In block 1110, the component uses the azimuth to find the closest bounding box by comparing the azimuth of the horizontal center of each bounding box with the azimuth of the speaking participant. In block 1115, the component determines the vertical center of the selected bounding box, and returns the elevation value for that position. The component then completes. In some embodiments, the SSL component is invoked to detect the elevation of a speaking participant, or to supplement the bounding box information from the MPD component similar to the method for detecting azimuth described above.

Figure 12:
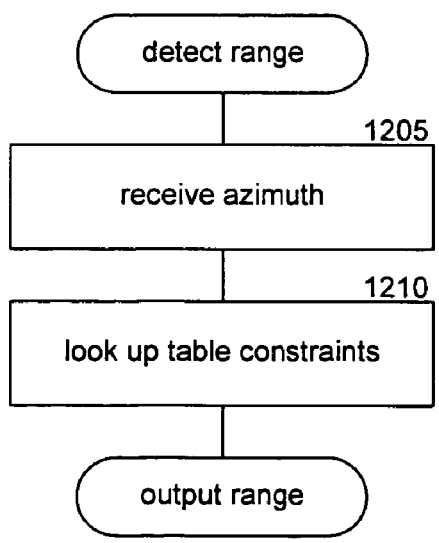
FIG. 12 is a flow diagram that illustrates the processing of the detect range component in one embodiment.

FIG. 12 is a flow diagram that illustrates the processing of the detect range component in one embodiment. The component is invoked to detect the range from the camera to the speaking participant. In block 1205, the component receives the azimuth of the speaking participant as determined by the detect azimuth component. In block 1210, the component looks up the range at the received azimuth as determined by the table constraints provided during the initial setup of the normalizing system. In some embodiments, the normalizing system also detects changes to the location of the videoconferencing endpoint since it was set up and adjusts the range based any changes in location. In some embodiments, the detect range component also uses information provided by the MPD component to refine the range based on the detected position of participants and edges of the table. The component then completes.

Figure 13A:
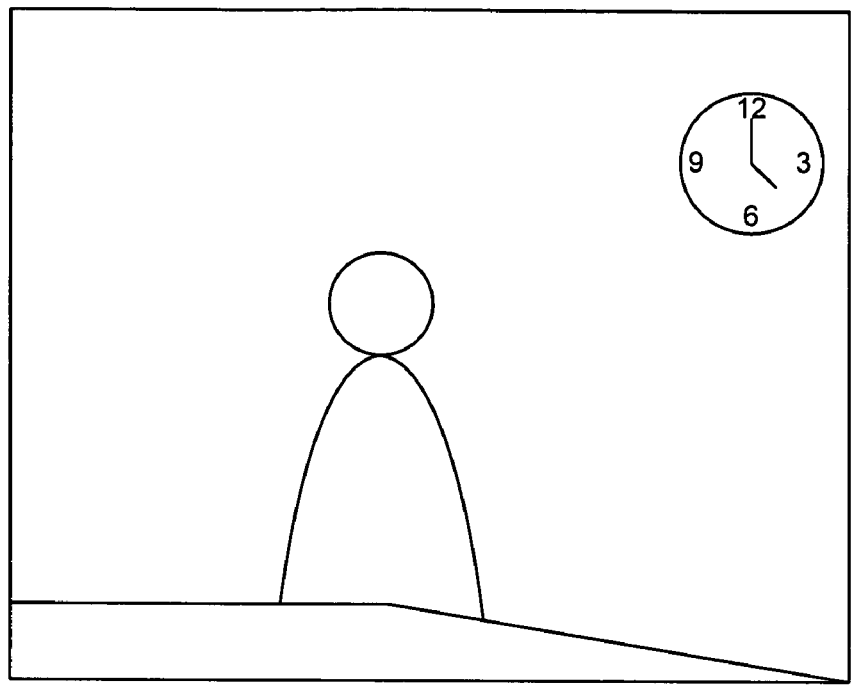
FIGS. 13a and 13b illustrate images with and without the normalizing system.
Figure 13B:
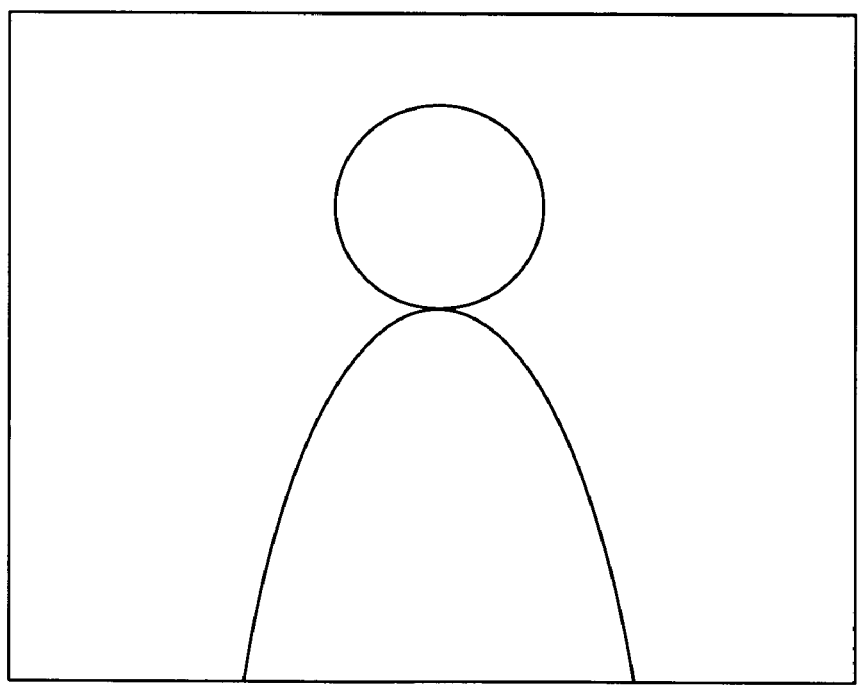

FIGS. 13a and 13b illustrate images with and without the normalizing system. FIG. 13a depicts a conference participant without using the normalizing system. The conference participant takes up only a small portion of the image. FIG. 13b depicts the same conference participant with normalization applied. The participant appears much larger in the image, and there is less extraneous visual information to distract the viewer.

Figure 14:
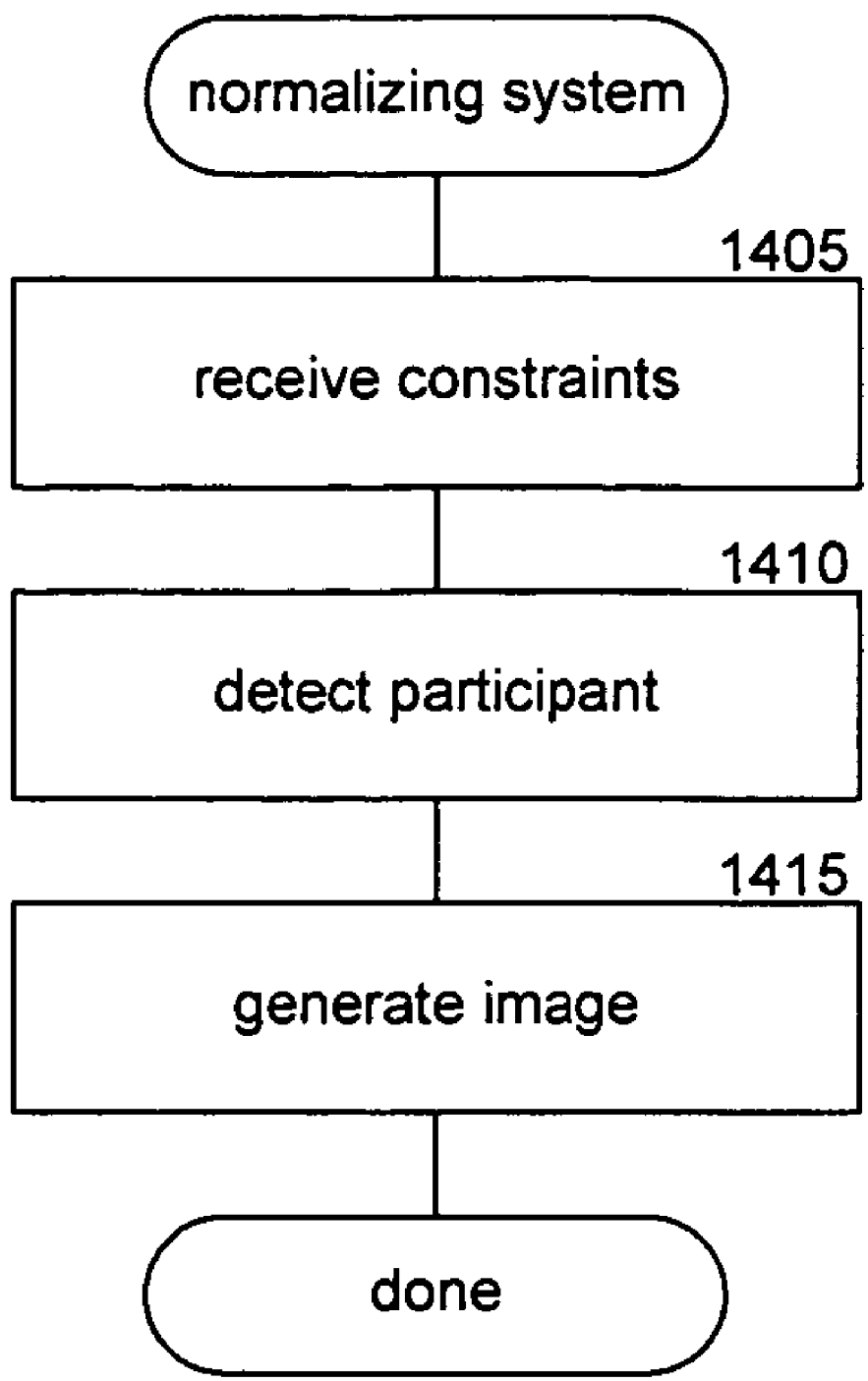
FIG. 14 is a flow diagram that illustrates the processing of the normalizing system in one embodiment.

FIG. 14 is a flow diagram that illustrates the processing of the normalizing system in one embodiment. In block 1405, the system receives constraints describing the table layout and orientation. In block 1410, the system detects a currently speaking participant. In block 1415, the system positions the camera to point to the speaking participant and generates an image of the participant such that the size of the participant is normalized. The component then completes.

From the foregoing, it will be appreciated that specific embodiments of the normalization system have been described herein for purposes of illustration, but that various modifications may be made without deviating from the spirit and scope of the invention. For example, a variety of types of cameras and videoconferencing endpoints may be used by the system. Particularly, techniques using both panoramic and non-panoramic cameras have been described, but other types of cameras could be used such as still cameras, video cameras, infrared cameras, etc. Multiple shapes and layouts of tables can be used with the normalizing system including rectangular, square, round, elliptical, etc. The system has been described in the context of videoconferencing, but the techniques described could be applied equally well in other situations. For example, the system could be used to monitor shoppers in a mall, animals in a zoo, classroom participants, or other settings. A participant as discussed in this specification refers to an object that is depicted in the image produced by the camera, which could be a person, an animal, and so on. The process of normalizing the size of conference participants has been discussed in terms of zooming to enlarge the size of a particular conference participant, but the camera could also physically move closer to the participant to create a larger image. Accordingly, the invention is not limited except as by the appended claims.

I claim:

1. A method in a computer system for normalizing the size of images of participants in video conference having a video, the video being captured by a camera having an associated magnetometer, comprising:

providing a set of constraints relating to the locations of participants relative to the camera, the constraints indicating dimensions of a table on which the camera is positioned, an initial orientation of the camera relative to the dimensions of the table and a magnetic field, and location of the camera on the table;

detecting with the magnetometer an orientation of the camera relative to the magnetic field;

comparing the detected orientation of the camera to the initial orientation of the camera;

determining a change in orientation of the camera based on the compared detected orientation and the initial orientation, the chance in orientation due to a movement by a person of the camera relative to the table;

identifying from sounds of a participant speaking a direction of the participant;

automatically pointing the camera in the identified direction; and generating an image of the participant having a size adjusted to account for the location of the participant relative to the camera as indicated by the provided constraints, the identified direction, and the determined change in orientation of the camera relative to the dimensions of the table.

2. The method of claim 1 wherein the constraints describe a table around which the participants are located.

3. The method of claim 1 wherein the camera is a virtual camera.

4. The method of claim 3 wherein the virtual camera operates on a panoramic image of the participants received from a panoramic camera.

5. The method of claim 4 wherein the generated image is a subset of the panoramic image created by at least one of cropping or scaling the panoramic image.

6. The method of claim 1 wherein the camera is a non-panoramic camera.

7. The method of claim 6 wherein generating the image includes at least one of panning, tilting, or zooming the camera.

8. The method of claim 1 wherein the speaking participant is detected by using a microphone.

9. The method of claim 1 wherein the generating of the image includes detecting an edge of the table and using the edge as the bottom position of the generated image.

10. The method of claim 1 wherein receiving the set of constraints includes automatically detecting the constraints.

11. A computer-readable medium containing instructions for controlling a computer system to perform a method for normalizing the size of images of participants in a video conference, a video of the video conference being captured by a panoramic camera having an associated magnetometer, by a method comprising:

providing a set of constraints relating to the locations of participants relative to the panoramic camera, the constraints indicating layout of a table on which the panoramic camera is positioned, an initial orientation of the panoramic camera relative to the layout of the table as indicated by the magnetometer, and location of the panoramic camera on the table detecting a current orientation of the panoramic camera as indicated by the magnetometer;

comparing the current orientation to the initial orientation;

determining a change in orientation of the panoramic camera based on the compared current orientation and the initial orientation, the chance resulting from movement of the panoramic camera relative to the layout of the table;

capturing a first image from the panoramic camera; and generating a second image from the first image of a participant having a size based on a layout of a table on which the panoramic camera is located and the determined change in orientation of the panoramic camera relative to the table.

12. The computer-readable medium of claim 11 wherein the layout of the table describes the distance from the camera to an edge of the table.

13. The computer-readable medium of claim 11 wherein the method includes automatically collecting the image associated with a participant who is currently speaking.

14. The computer-readable medium of claim 13 wherein the speaking participant is detected by using a microphone.

15. The computer-readable medium of claim 13 wherein the generating of the second image includes detecting an edge of the table and sizing the second image to exclude the edge.

* * * * *

UNITED STATES PATENT AND TRADEMARK OFFICE
CERTIFICATE OF CORRECTION

PATENT NO.       : 7,576,766 B2                                          Page 1 of 1
APPLICATION NO. : 11/171630
DATED            : August 18, 2009
INVENTOR(S)      : Ross Cutler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Seventh Day of September, 2010

David J. Kappos
*Director of the United States Patent and Trademark Office*